US010823852B2

(12) United States Patent
Zhang

(10) Patent No.: US 10,823,852 B2
(45) Date of Patent: Nov. 3, 2020

(54) LASER PROJECTOR, CAMERA UNIT AND ELECTRONIC DEVICE

(71) Applicant: GUANGDONG OPPO MOBILE TELECOMMUNICATIONS CORP., LTD., Dongguan, Guangdong (CN)

(72) Inventor: Xueyong Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/379,887

(22) Filed: Apr. 10, 2019

(65) Prior Publication Data

US 2019/0317216 A1   Oct. 17, 2019

(30) Foreign Application Priority Data

Apr. 16, 2018  (CN) .......................... 2018 1 0338838
Apr. 16, 2018  (CN) .......................... 2018 1 0338839

(51) Int. Cl.
*G01S 17/48*   (2006.01)
*G06T 7/521*   (2017.01)
(Continued)

(52) U.S. Cl.
CPC .............. *G01S 17/48* (2013.01); *G01S 17/89* (2013.01); *G02B 7/02* (2013.01); *G02B 27/4205* (2013.01);
(Continued)

(58) Field of Classification Search
None
See application file for complete search history.

(56) References Cited

U.S. PATENT DOCUMENTS 10,310,281 B1 *   6/2019   Lee .................... G06K 9/00201
2007/0019103 A1   1/2007   Lieberman et al.
(Continued)

FOREIGN PATENT DOCUMENTS

CN    203797573    8/2014
CN    105319811    2/2016
(Continued)

OTHER PUBLICATIONS

Machine Translation for CN206209271 in English from Googe Patents (Year: 2017).*

(Continued)

*Primary Examiner* — Fernando Alcon
(74) *Attorney, Agent, or Firm* — Hodgson Russ LLP

(57) ABSTRACT

A laser projector is provided. The laser projector includes a substrate assembly, a lens barrel assembly, an edge-emitting laser, a collimation element, and a diffraction element. The lens barrel assembly includes a first component and a second component movably connected to each other, and the first component is disposed to the substrate assembly. The edge-emitting laser is disposed to the substrate assembly. The collimation element is mounted to one of the first component and the second component and is configured to collimate a laser emitted by the edge-emitting laser. The edge-emitting laser includes a light emitting face facing the collimation element. The diffraction element is disposed to the second component and is configured to diffract the laser collimated by the collimation element to form a laser pattern.

18 Claims, 10 Drawing Sheets

(51) Int. Cl.
*G01S 17/89* (2020.01)
*G02B 7/02* (2006.01)
*G02B 27/42* (2006.01)
*H04N 5/225* (2006.01)

(52) U.S. Cl.
CPC ........... *G06T 7/521* (2017.01); *H04N 5/2256* (2013.01); *G06T 2207/10028* (2013.01)

(56) References Cited

U.S. PATENT DOCUMENTS

| 2017/0187997 | A1 | 6/2017 | Hsiao et al. | |
|---|---|---|---|---|
| 2017/0331254 | A1* | 11/2017 | Li | H01S 5/18361 |
| 2019/0104239 | A1* | 4/2019 | Aschwanden | H04M 1/0264 |
| 2019/0235217 | A1* | 8/2019 | Hasegawa | G02B 7/021 |
| 2020/0026080 | A1* | 1/2020 | Pierer | H01S 5/02292 |

FOREIGN PATENT DOCUMENTS

| CN | 205228396 | 5/2016 | |
|---|---|---|---|
| CN | 206209271 | 5/2017 | |
| CN | 107102506 | 8/2017 | |
| CN | 107167997 | 9/2017 | |
| CN | 107229173 | 10/2017 | |
| CN | 206805630 | 12/2017 | |
| CN | 108594458 | 9/2018 | |
| CN | 108594459 | 9/2018 | |
| JP | 2000019374 | 1/2000 | |
| TW | 201639908 | 11/2016 | |
| WO | WO-2017220015 A1 * | 12/2017 | ............. G02B 7/025 |

OTHER PUBLICATIONS

EPO, Office Action for EP Application No. 19169155.9, dated Jul. 1, 2019.
SIPO, First Office Action for CN Application No. 201810338838.X, dated Aug. 5, 2019.
SIPO, First Office Action for CN Application No. 201810338839.4, dated Aug. 5, 2019.
WIPO, English Translation of the ISR and WO for PCT/CN2019/075376, dated May 29, 2019.
TIPO, Office Action for TW Application No. 108112770, dated Jan. 6, 2020.

* cited by examiner

LASER PROJECTOR, CAMERA UNIT AND ELECTRONIC DEVICE

PRIORITY INFORMATION

This application claims priority to Chinese Patent Application No. 201810338838.X, filed on Apr. 16, 2018, and claims priority to Chinese Patent Application No. 201810338839.4, filed on Apr. 16, 2018, the entire disclosures of which are incorporated herein by reference.

FIELD

The present disclosure relates to a field of stereo imaging technology, particularly to a laser projector, a camera unit and an electronic device.

BACKGROUND

Existing laser projectors typically have a small volume to facilitate integration of the laser projector into an electronic device, such as a cell phone. When the volume of the laser projector is small, each component in the laser projector is also very small, so that it is easy to damage the component or difficult to ensure higher installation accuracy in the installation process.

SUMMARY

Embodiments of the present disclosure provide a laser projector, a camera unit and an electronic device.

The laser projector according to embodiments of the present disclosure includes a substrate assembly, a lens barrel assembly, an edge-emitting laser, a collimation element, and a diffraction element. The lens barrel assembly includes a first component and a second component movably connected to each other, and the first component is disposed to the substrate assembly. The edge-emitting laser is disposed to the substrate assembly. The collimation element is mounted to one of the first component and the second component and is configured to collimate a laser emitted by the edge-emitting laser. The edge-emitting laser includes a light emitting face, and the light emitting face faces the collimating element. The diffraction element is disposed to the second component and is configured to diffract the laser collimated by the collimation element so as to form a laser pattern. The camera unit includes a laser projector, an image acquirer, and a processor. The laser projector includes a substrate assembly, a lens barrel assembly, an edge-emitting laser, a collimation element, and a diffraction element. The lens barrel assembly includes a first component and a second component movably connected to each other, and the first component is disposed to the substrate assembly. The edge-emitting laser is disposed to the substrate assembly. The collimation element is mounted to one of the first component and the second component and configured to collimate a laser emitted by the edge-emitting laser towards the collimation element. The diffraction element is disposed to the second component and configured to diffract the laser collimated by the collimation element to form a laser pattern. The image acquirer is configured to acquire the laser pattern projected by the laser projector into a target space. The processor is configured to process the laser pattern to obtain a depth image.

The electronic device includes a housing and a camera unit. The camera includes a laser projector, an image acquirer, and a processor. The laser projector includes a substrate assembly, a lens barrel assembly, an edge-emitting laser, a collimation element, and a diffraction element. The lens barrel assembly includes a first component and a second component disposed movably with respect to each other, and the first component is connected to the substrate assembly. The edge-emitting laser is disposed inside the lens barrel assembly. The collimation element is mounted to one of the first component and the second component and configured to collimate a laser emitted by the edge-emitting laser, and the edge-emitting laser includes a light emitting face, and the light emitting face faces the collimation element. The diffraction element is disposed to the second component and configured to diffract the laser collimated by the collimation element. The image acquirer is configured to acquire the laser pattern projected by the laser projector into a target space. The processor is configured to process the laser pattern to obtain a depth image. The camera unit is arranged in the housing and exposed out of the housing to acquire the depth image.

BRIEF DESCRIPTION OF THE DRAWINGS

The above and/or additional aspects and advantages of the present disclosure will become apparent and easy to understand from descriptions of the embodiments with reference to the drawings, in which.

DETAILED DESCRIPTION

Figure 1:
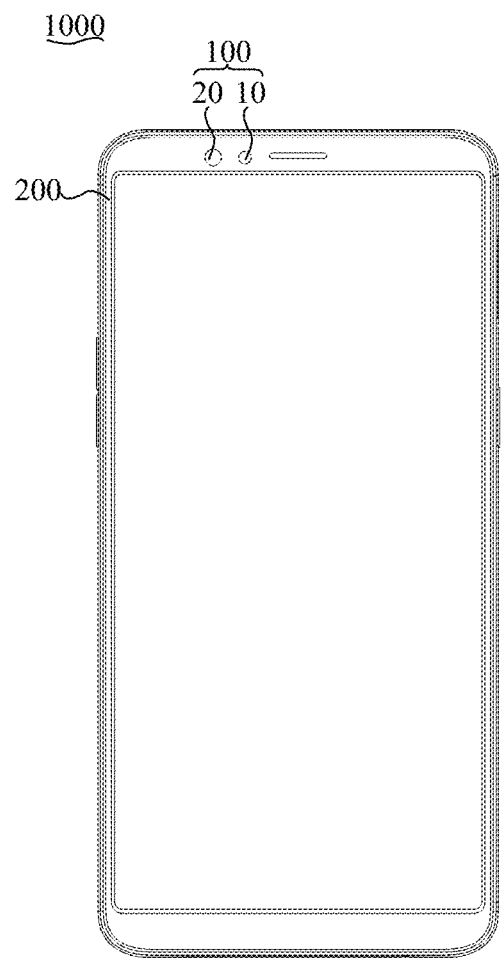
FIG. 1 is a schematic view illustrating an electronic device according to embodiments of the present disclosure.

Embodiments of the present disclosure are further described below in detail, examples of the embodiments are shown in accompanying drawings, and reference signs that are the same or similar from beginning to end represent the same or similar components or components that have the same or similar functions.

The embodiments described below with reference to the accompanying drawings are exemplary, are merely used to explain the present disclosure, and cannot be construed as a limit to the present disclosure.

In the present disclosure, unless specified or limited otherwise, the first characteristic is "on" or "under" the second characteristic refers to the first characteristic and the second characteristic can be direct or via media indirect mountings, connections, and couplings. And, the first characteristic is "on", "above", "over" the second characteristic may refer to the first characteristic is right over the second characteristic or is diagonal above the second characteristic, or just refer to the horizontal height of the first characteristic is higher than the horizontal height of the second characteristic. The first characteristic is "below" or "under" the second characteristic may refer to the first characteristic is right over the second characteristic or is diagonal under the second characteristic, or just refer to the horizontal height of the first characteristic is lower than the horizontal height of the second characteristic.

Embodiments of the present disclosure provide a laser projector, a camera unit and an electronic device.

The laser projector according to embodiments of the present disclosure includes a substrate assembly, a lens barrel assembly, an edge-emitting laser, a collimation element, and a diffraction element. The lens barrel assembly includes a first component and a second component movably connected to each other, and the first component is disposed to the substrate assembly. The edge-emitting laser is disposed to the substrate assembly. The collimation element is mounted to one of the first component and the second component and is configured to collimate a laser emitted by the edge-emitting laser. The edge-emitting laser includes a light emitting face, and the light emitting face faces the collimating element. The diffraction element is disposed to the second component and is configured to diffract the laser collimated by the collimation element so as to form a laser pattern.

The camera unit includes a laser projector, an image acquirer, and a processor. The laser projector includes a substrate assembly, a lens barrel assembly, an edge-emitting laser, a collimation element, and a diffraction element. The lens barrel assembly includes a first component and a second component movably connected to each other, and the first component is disposed to the substrate assembly. The edge-emitting laser is disposed to the substrate assembly. The collimation element is mounted to one of the first component and the second component and configured to collimate a laser emitted by the edge-emitting laser towards the collimation element. The diffraction element is disposed to the second component and configured to diffract the laser collimated by the collimation element to form a laser pattern. The image acquirer is configured to acquire the laser pattern projected by the laser projector into a target space. The processor is configured to process the laser pattern to obtain a depth image.

The electronic device includes a housing and a camera unit. The camera includes a laser projector, an image acquirer, and a processor. The laser projector includes a substrate assembly, a lens barrel assembly, an edge-emitting laser, a collimation element, and a diffraction element. The lens barrel assembly includes a first component and a second component disposed movably with respect to each other, and the first component is connected to the substrate assembly. The edge-emitting laser is disposed inside the lens barrel assembly. The collimation element is mounted to one of the first component and the second component and configured to collimate a laser emitted by the edge-emitting laser, and the edge-emitting laser includes a light emitting face, and the light emitting face faces the collimation element. The diffraction element is disposed to the second component and configured to diffract the laser collimated by the collimation element. The image acquirer is configured to acquire the laser pattern projected by the laser projector into a target space. The processor is configured to process the laser pattern to obtain a depth image. The camera unit is arranged in the housing and exposed out of the housing to acquire the depth image. A laser projector 10 according to an embodiment of the present disclosure includes a substrate assembly 11, a lens barrel assembly 12, a light source 13, a collimation element 14, and a diffraction element 15. The lens barrel assembly 12 is disposed to the substrate assembly 11 and includes a first component and a second component movably connected to each other, and the first component is disposed to the substrate assembly 11. The light source 13 is disposed to the substrate assembly 11. The collimation element 14 is mounted to the lens barrel assembly 12 and is configured to collimate the laser emitted by the light source 13. The light source 13 is an edge-emitting laser, and the edge-emitting laser includes a light emitting face 131 facing the collimation element 14. The diffraction element 15 is disposed to the second component and is configured to diffract the laser collimated by the collimation element 14 to form a laser pattern.

In some embodiments, the first component is a base 121 and the second component is a support 122. The support 122 is movable along an axial direction of the lens barrel assembly 122 relative to the base 121. The collimation element 14 is disposed to the support 122.

In some embodiments, an external thread is formed on an outer side wall of a top end of the base 121, an internal thread is formed on an inner side wall of a bottom end of the support 122, and the support 122 and the base 121 are movably connected through screw engagement of the internal thread and the external thread.

In some embodiments, the laser projector 10 further includes a blocking member 16, a blocking hole 1224 is defined in an outer side wall of the support 122, and the blocking member 16 passes through the blocking hole 1224 and can be abutted against the base 121.

In some embodiments, an internal thread is formed on an inner side wall of the top end of the base 121, an external thread is formed on an outer side wall of the bottom end of the support 122, and the support 122 and the base 121 are movably connected through screw engagement of the external thread and the internal thread.

In some embodiments, the laser projector 10 further includes a locking member 17, an outer side wall of the base 121 is provided with a locking hole 1214, and the locking member 17 passes through the locking hole 1214 and can be abutted against the support 122.

In some embodiments, an annular thread groove 1215 is defined in a top face of the base 121, a thread is formed on a side wall of the bottom end of the support 122, and the support 122 and the base 121 are movably connected through screw engagement of the thread and the thread groove 1215; or the annular thread groove 1215 is defined in a bottom face of the support 122, the thread is formed on a side wall of the top end of the base 121, and the support 122 and the base 121 are movably connected through screw engagement of the thread groove 1215 and the thread.

In some embodiments, the first component is a collimation support 40, the second component is a diffraction support 50, and the collimation support 40 and the diffraction support 50 are separated structures. The collimation element 14 is supported by the collimation support 40. The diffraction element 15 is supported by the diffraction support 50.

In some embodiments, the collimation support 40 and the diffraction support 50 are both supported on the substrate assembly 11, and the collimation support 40 is accommodated in the diffraction support 50.

In some embodiments, the collimation support 40 is supported on the substrate assembly 11, the internal thread is formed on an inner side wall of a bottom end of the diffraction support 50, the external thread is formed on an outer side wall of a top end of the collimation support 40, and the diffraction support 50 and the collimation support 40 are connected through screw engagement of the internal thread and the external thread; or the collimation support 40 is supported on the substrate assembly 11, the external thread is formed on an outer side wall of the bottom end of the diffraction support 50, the internal thread is formed on an inner side wall of the top end of the collimation support 40, and the diffraction support 50 and the collimation support 40 are connected through screw engagement of the internal thread and the external thread.

In some embodiments, the collimation support 40 is supported on the substrate assembly 11, the diffraction support 50 includes a support body 55 and an annular boss 56 extending out from an outer side wall of the support body 55, the support body 55 is partially accommodated in the collimation support 40, and the annular boss 56 is fixed on a top of the collimation support 40; or the collimation support 40 is supported on the substrate assembly 11, the diffraction support 50 includes the support body 55 and the annular boss 56 extending out from an inner side wall of the support body 55, the collimation support 40 is partially accommodated in the support body 55, and the annular boss 56 is fixed on the top of the collimation support 40.

In some embodiments, the collimation support 40 is supported on the substrate assembly 11, and the bottom end of the diffraction support 50 is fixed to the top end of the collimation support 40 in a snap-fitted manner.

In some embodiments, a snapping groove 45 is defined in a top face of the collimation support 40, a bottom face of the diffraction support 50 is provided with an elastic snapping hook 57, and the elastic snapping hook 57 is snap-fitted into the snapping groove 45.

In some embodiments, the snapping groove 45 and the elastic snapping hook 57 are both annular.

In some embodiments, the collimation support 40 is supported on the substrate assembly 11, the annular thread groove is defined in the top face of the collimation support 40, and the thread is formed on the side wall of the bottom end of the diffraction support 50, and the thread is screwed into the thread groove to fix the bottom end of the diffraction support 50 to the top face of the collimation support 40; or the collimation support 40 is supported on the substrate assembly 11, the annular thread groove is defined in the bottom face of the diffraction support 50, and the thread is formed on the side wall of the top end of the collimation support 40, and the thread is screwed into the thread groove to fix the top end of the collimation support 40 to the bottom face of the diffraction support 50.

In some embodiments, the laser projector 10 further includes a fixing member 18 configured to fix the edge-emitting laser to the substrate assembly 11.

In some embodiments, the substrate assembly 11 includes a substrate 111 and a circuit board 112, the circuit board 112 is disposed to the substrate 111 and electrically connected to the edge-emitting laser. The fixing member 18 includes a sealant 181 disposed between the edge-emitting laser and the substrate assembly 111, and the sealant 181 is thermal conductive glue.

In some embodiments, the fixing member 18 includes at least two elastic support frames 182 disposed to the substrate assembly 11, the at least two support frames 182 define an accommodating space 183 together, the accommodating space 183 is configured to receive the edge-emitting laser therein, and the at least two support frames 182 are configured to support the edge-emitting laser.

The camera unit 100 according to the embodiment of the present disclosure includes the laser projector 10 described in the above embodiments, an image acquirer 20, and a processor 30. The image acquirer 20 is configured to acquire the laser pattern projected by the laser projector 10 into a target space. The processor 30 is configured to process the laser pattern to obtain a depth image.

The electronic device 1000 according to the embodiment of the present disclosure includes a housing 200 and the camera unit 100 described in the above embodiments. The camera unit 100 is arranged in the housing 200 and exposed out of the housing to acquire the depth image.

Figure 2:
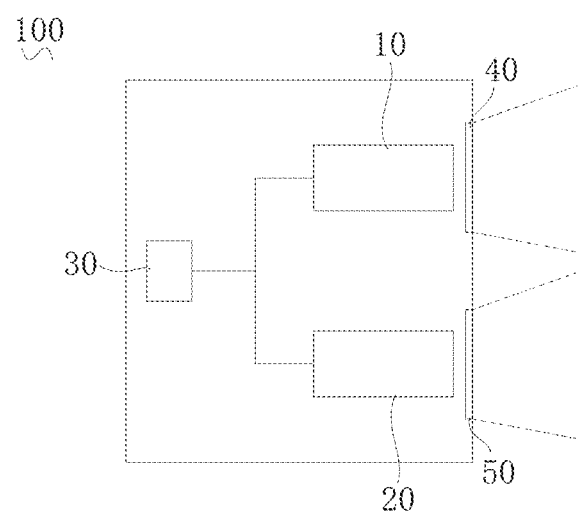
FIG. 2 is a schematic view illustrating a camera unit according to embodiments of the present disclosure.

As illustrated in FIGS. 1 and 2, the electronic device 1000 is provided by the present disclosure. The electronic device 1000 may be a smart phone, a smart bracelet, a smart watch, a tablet computer, smart glasses, a smart helmet, a somatosensory game device, or the like. The electronic device 1000 includes the housing 200 and the camera unit 100. The camera unit 100 is arranged in the housing 200 and exposed out of the housing 200 to acquire the depth image. The camera unit 100 includes the laser projector 10, the image acquirer 20 and the processor 30. The laser projector 10 is configured to project the laser pattern to the target space. The image acquirer 20 is configured to acquire the laser pattern projected by the laser projector 10 into the target space. The processor 30 is configured to obtain the laser pattern acquired by the image acquirer 20 to obtain the depth image.

Specifically, the laser projector 10 projects the laser pattern into the target space through a projection window 40. The image acquirer 20 acquires the laser pattern modulated by a target object through an acquisition window 50. The image acquirer 20 can be an infrared camera. The processor 30 calculates a deviation value between each pixel point in the laser pattern and corresponding pixel point in the reference pattern with an image matching algorithm, and then obtains the depth image of the laser pattern based on the deviation value, in which the image matching algorithm may be a digital image correlation (DIC) algorithm. Certainly, other image matching algorithms may be adopted to replace the DIC algorithm.

Figure 3:
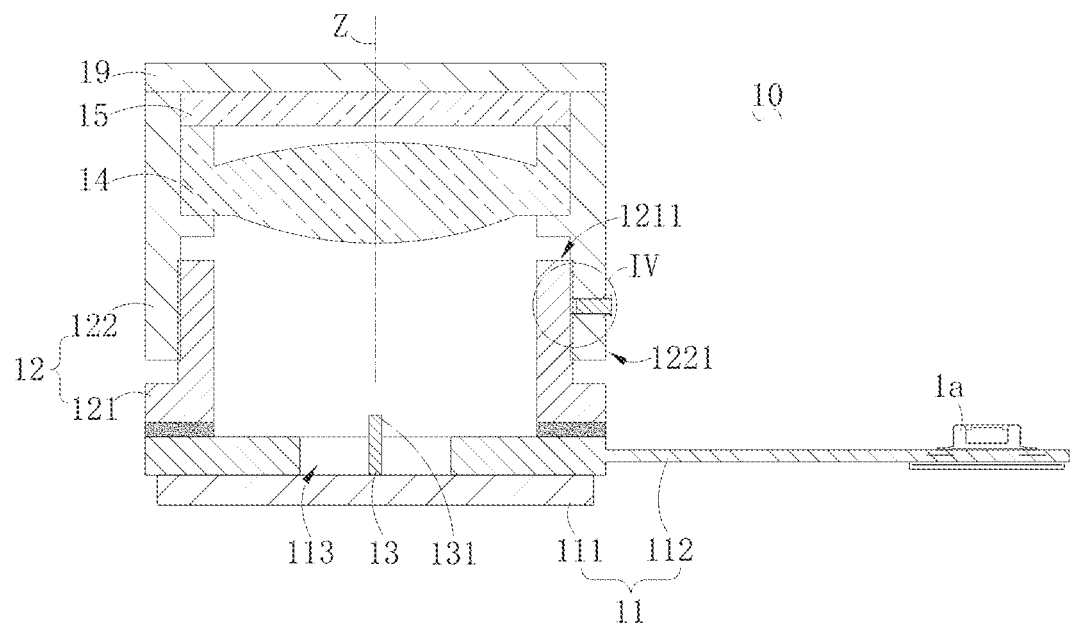
FIG. 3 is a schematic view illustrating a laser projector according to embodiments of the present disclosure.

As illustrated in FIG. 3, the laser projector 10 includes the substrate assembly 11, the lens barrel assembly 12, the light source 13, the collimation element 14 and the diffraction element 15. The light source 13, the collimation element 14 and the diffraction element 15 are sequentially disposed in an optical path of the light source 13. Specifically, the light emitted from the light source 13 passes through the collimation element 14 and the diffraction element 15 in sequence.

The substrate assembly 11 includes the substrate 111 and the circuit board 112 supported on the substrate 111. The substrate 111 is used for bearing the lens barrel assembly 12, the light source 13 and the circuit board 112. The material of the substrate 11 may be plastic, such as at least one of polyethylene glycol terephthalate (PET), polymethyl methacrylate (PMMA), polycarbonate (PC), and polyimide (PI). That is, the substrate 111 can be made of a single plastic material of any one of PET, PMMA, PC and PI. As such, the substrate 111 is light in weight and has sufficient support strength.

The circuit board 112 may be any one of a printed circuit board, a flexible circuit board, and a rigid-flex board. The circuit board 112 may be provided with an accommodating hole 113, and the accommodating hole 113 may be used for accommodating the light source 13 therein. A part of the circuit board 112 is covered by the lens barrel assembly 12, and another part of the circuit board 112 extends out to be connected to the connector 1*a*. The connector 1*a* may connect the laser projector 10 to a main board of the electronic device 1000.

The lens barrel assembly 12 is disposed to the substrate assembly 11. The lens barrel assembly 12 includes the first component and the second component, the first component is movably connected to the second component. The first component is disposed to the substrate assembly 11.

In the embodiment shown in FIGS. 3-7, the first component is the base 121 and the second component is the support 122, i.e., the lens barrel assembly 12 includes the base 121 and the support 122. The base 121 is disposed to the substrate assembly 11, and the support 122 is movably connected to the base 121. Specifically, the base 121 is disposed between the support 122 and the substrate assembly 11, and the base 121 and the substrate assembly 11 can be fixedly connected by adhesive, and the base 121 can be disposed around the light source 13. The collimation element 14 can be mounted to the support 122, and the support 122 can move relative to the base 121 along the axis of the lens barrel assembly 12 (such as the Z-axis in FIG. 3) to change a distance of the collimation element 14 from the light source 13.

Figure 4:
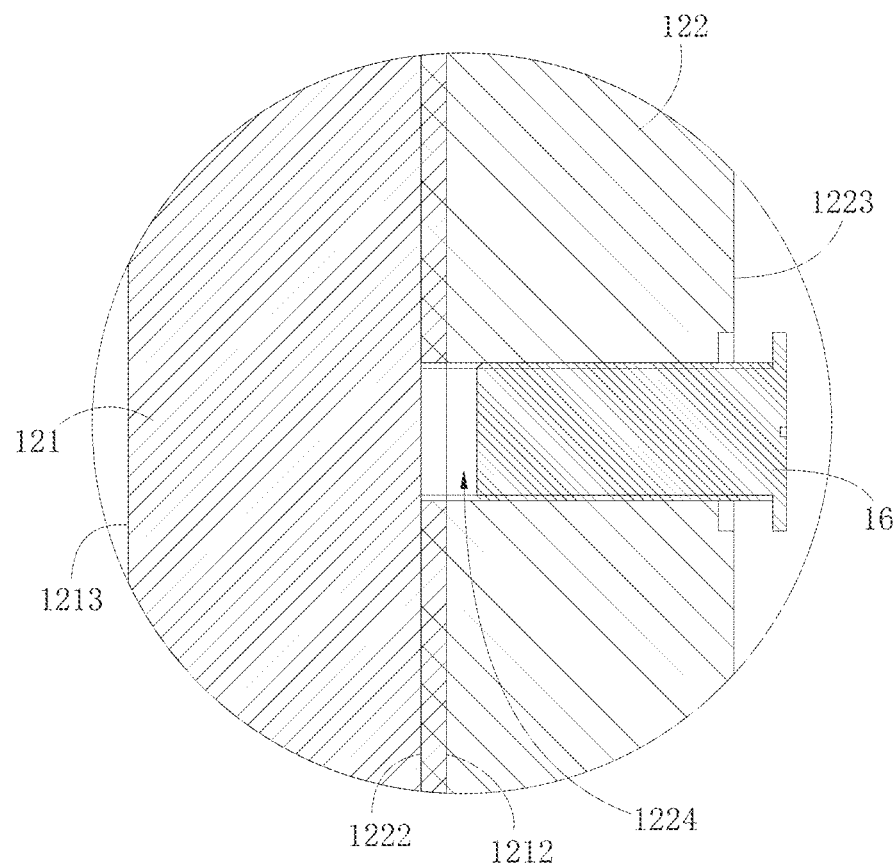
FIG. 4 is an enlarged schematic view illustrating a portion IV of the laser projector shown in FIG. 3.

As illustrated in FIGS. 3 and 4, in an embodiment, the external thread is formed on the outer side wall 1212 of the top end 1211 of the base 121, the internal thread is formed on the inner side wall 1222 of the bottom end 1221 of the support 122, and the support 122 and the base 121 are movably connected through screw engagement of the internal thread and the external thread. The support 122 can be enabled to rotate relative to the base 121 by rotating the support 122, and under the action of the internal thread and the external thread, a bonding area of the outer side wall 1212 and the inner side wall 1222 is changed, so that the support 122 moves relative to the base 121 in the axial direction of the lens barrel assembly 12. In actual use, the support 122 can be manually rotated to a proper position, and then the support 122 can be fixed so as not to rotate, thereby fixing a relative position of the support 122 and the base 121; the support 122 can also be driven to rotate to a predetermined position by a motor to control the relative position of the support 122 and the base 121 in real time.

As illustrated in the embodiments of FIGS. 3 and 4, the laser projector 10 further includes a blocking member 16, the blocking hole 1224 is defined in the outer side wall 1223 of the support 122, and the blocking member 16 passed through the blocking hole 1224 and can be abutted against the base 121. Specifically, the blocking member 16 can be a screw, and the blocking hole 1224 can be a screw hole. When the support 122 is rotated to the proper position, the blocking member 16 can be screwed into the blocking hole 1224 and can be abutted against the base 121. In this case, the support 122 can no longer rotate relative to the base 121. When the support 122 needs to be rotated again, the screw can be unscrewed so that the screw no longer abuts against the base 121, and in this case, the support 122 can be rotated relative to the base 121.

The light source 13 is configured to emit laser. The light source 13 is disposed to the substrate assembly 11, and the light source 13 is electrically connected to the circuit board 112 and further electrically connected to the processor 30 via the circuit board 112. The light source 13 may be the edge-emitting laser (EEL), and the light emitting face 131 of the edge-emitting laser faces towards the collimation element 14. Specifically, the light source 13 may be a distributed feedback laser (DFB). Characterized in low temperature drift and a single point light emitting structure, the distributed feedback laser needs no array structure and can be easily produced, thus the cost of the laser projector 10 is low. When the laser of the distributed feedback laser propagates, the power gain is obtained through feedbacks of the grating structure. In order to enhance the power of the distributed feedback laser, an injected current and/or a length of the distributed feedback laser need to be increased. Since increasing the injected current will increase the power consumption of the distributed feedback laser and cause a severe heat emission, in order to ensure that the distributed feedback laser can operate normally, it is required to increase the length of the distributed feedback laser. As the length of the distributed feedback laser increases, the height of the laser projector 10 also increases. The distributed feedback laser of the embodiment of the present disclosure is received in the accommodating hole 113 of the circuit board 112, which can reduce the influence of the increase of the length of the distributed feedback laser on the height of the laser projector 10, and ensure that the distributed feedback laser can operate normally.

Figure 5:
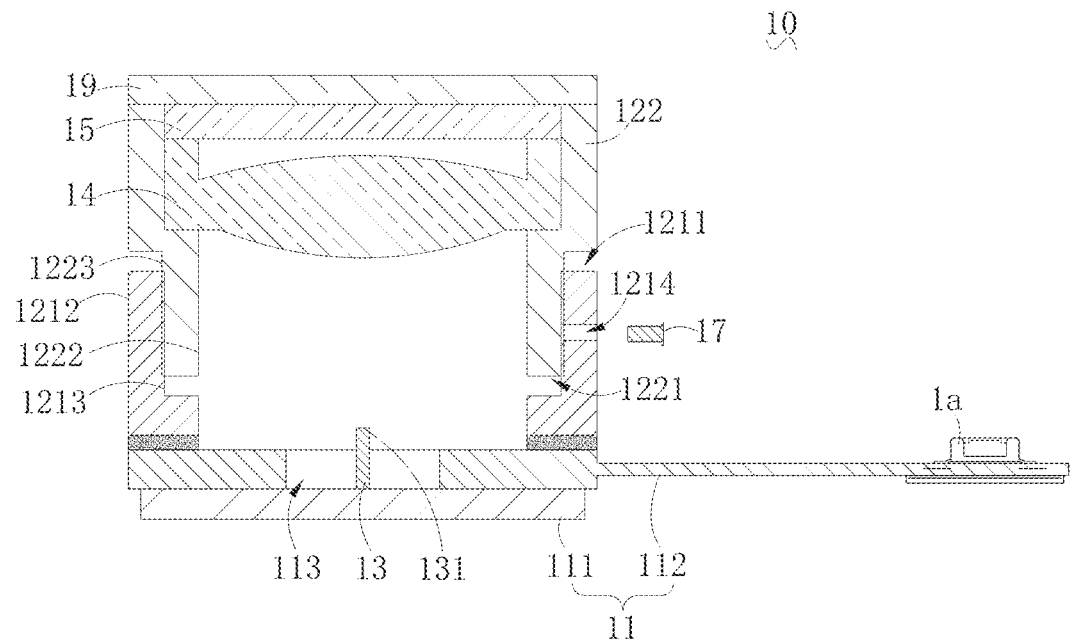
FIGS. 5-7 are schematic views illustrating a laser projector according to another embodiment of the present disclosure.

As illustrated in FIGS. 3 and 5, the collimation element 14 is configured to collimate the laser emitted by the light source 13, and the collimated laser is projected to the diffraction element 15. The collimation element 14 may be an optical lens such as a spherical lens, an aspherical lens, a threaded lens, etc. The collimation element 14 is disposed to the support 122. It can be understood that changing the distance between the collimation element 14 and the light source 13 without changing the collimation element 14 can make a concentration degree of the laser that is collimated by the collimation element 14 and is projected to the diffraction element 15 be changed, so that the diffraction element 15 projects different laser patterns. Since the collimation element 14 according to the embodiment of the present disclosure is disposed to the support 122, the distance between the collimation element 14 and the light source 13 can be changed by moving the support 122 relative to the base 121, so that the laser projector 10 projects different laser patterns.

The diffraction element 15 may be provided with a diffraction grating. The laser collimated by the collimation element 14 is incident on the diffraction element 15, and then is diffracted by the diffraction grating to form a laser pattern to exit. In the embodiment of the present disclosure, the diffraction element 15 is disposed to the collimation element 14, and the diffraction element 15 moves together with the collimation element 14.

In the prior art, a structured light projector is configured to project a structured light pattern into the target space to obtain the depth image. Generally, it is required that a light beam emitted from the light source of the structured light projector passes through a collimation lens, and then the light beam collimated by the collimation lens is diffracted by the diffraction element to form a structured light pattern. However, in actual installation and use, it is usually difficult to achieve a desired distance between the collimation lens and the light source due to assembly errors and the like, resulting in poor collimation effect of the collimation lens. To sum up, in the electronic device 1000 according to the embodiment of the present disclosure, the light source 13 is disposed to the substrate assembly 11 and the collimation element 14 is disposed to the support 122, a movement of the support 122 relative to the base 121 can be controlled to adjust the distance of the collimating element 14 from the light source 13 to the desired distance to ensure better collimation effect. The collimation element 14 is supported by the base 121, and the diffraction element 15 is supported by the support 122, so the base 121 and the support 122 are separate structures independent of each other, instead of being integrally formed. Thus, the collimation element 14 and the diffraction element 15 can be mounted separately and then assembled without being limited by space. The relative positions of the light source 13, the collimation element 14 and the diffraction element 15 are easy to adjust, the mounting accuracy is easy to control, and the mounting efficiency is high.

As illustrated in FIG. 3, in some embodiments, the laser projector 10 also includes a protective cover 19. The protective cover 19 is mounted to the support 122 and is configured to confine the diffraction element 15 to the support 122 to prevent the diffraction element 15 from escaping from the support 122. In the embodiment of the present disclosure, the protective cover 19 is fixed on the support 122 by adhesive. The protective cover 19 may be made of a light-transparent material, such as glass, etc. The laser pattern diffracted by the diffraction element 15 may pass through the protective cover 19 and be projected from the laser projector 10. In other embodiments, the protective cover 19 may also be provided with a light-transparent hole, and the light-transparent hole may correspond to the diffraction structure on the diffraction element 15, and the laser pattern diffracted by the diffraction element 15 may pass through the light-transparent hole.

The structure for realizing the movement of the support 122 relative to the base 121 is not limited to the above discussion, but can also be realized by other ways. Several feasible ways will be exemplarily given below, and it will be understood that the ways that can be realized are not limited to several embodiments. For example, as illustrated in FIG. 5, in some embodiments, the internal thread is formed on the inner side wall 1213 of the top end 1211 of the base 121, the external thread is formed on the outer side wall 1223 of the bottom end 1221 of the support 122, and the support 122 and the base 121 are movably connected through screw engagement of the external thread and the internal thread. The support 122 can be enabled to rotate relative to the base 121 by rotating the support 122, and under the action of the external thread and the internal thread, the bonding area of the inner side wall 1213 and the outer side wall 1223 is changed, so that the support 122 moves relative to the base 121 in the axial direction of the lens barrel assembly 12. Further, in the embodiment as illustrated in FIG. 5, the laser projector 10 further includes the locking member 17, the outer side wall 1212 of the base 121 is provided with the locking hole 1214, and the locking member 17 passes through the locking hole 1214 and can be abutted against the support 122. Specifically, the locking member 17 may be the screw, and the locking hole 1214 may be the screw hole. When the support 122 is rotated to the proper position, the locking member 17 may be screwed into the locking hole 1214 and abutted against the support 122, in this case the support 122 can no longer rotate relative to the base 121. When it is required to rotate the support 122 again, the screw can be unscrewed so that the screw no longer abuts against the support 122. In this case, the support 122 can be rotated relative to the base 121.

Figure 6:
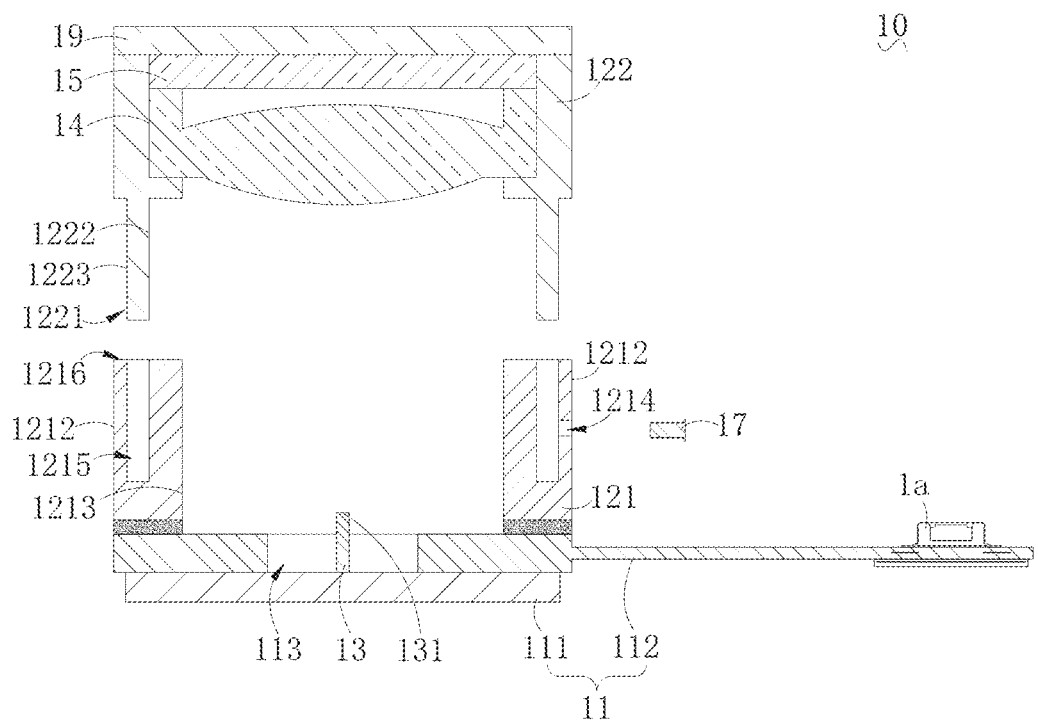

For example, as illustrated in FIG. 6, in some embodiments, the annular thread groove 1215 is defined in the top face 1216 of the base 121, the thread is formed on the side wall (1222, 1223) of the bottom end 1221 of the support 122, and the support 122 and the base 121 are movably connected through screw engagement of the thread and the thread groove 1215. The side walls (1222, 1223) of the support 122 are screwed into the thread groove 1215, and when the support 122 is rotated, it is enabled to move relative to the base 121 in the axial direction of the lens barrel assembly 12. Specifically, the thread may be an internal thread formed on the outer side wall 1223 of the support 122, while the external thread may be formed on a wall of the thread groove 1215 adjacent to the outer side wall 1212 of the base 121, and the internal thread is screwed with the external thread. Or, the thread may be the external thread formed on the inner side wall 1222 of the support 122, while the inner thread may be formed on the wall of the thread groove 1215 adjacent to the inner side wall 1213 of the base 121, and the external thread is screwed with the internal thread. The thread may also include both the external thread and the internal thread formed on the side walls (1222, 1223) of the support 122 in this embodiment, and the thread groove 1215 may be fitted with the external thread and the internal thread on the side walls (1222, 1223) of the support 122 simultaneously. It can be understood that the above locking hole 1214 can be defined in the outer side wall 1212 of the base 121, and the locking member 17 can pass through the locking hole 1214 and abut against the support 122, which are not described herein.

Figure 7:
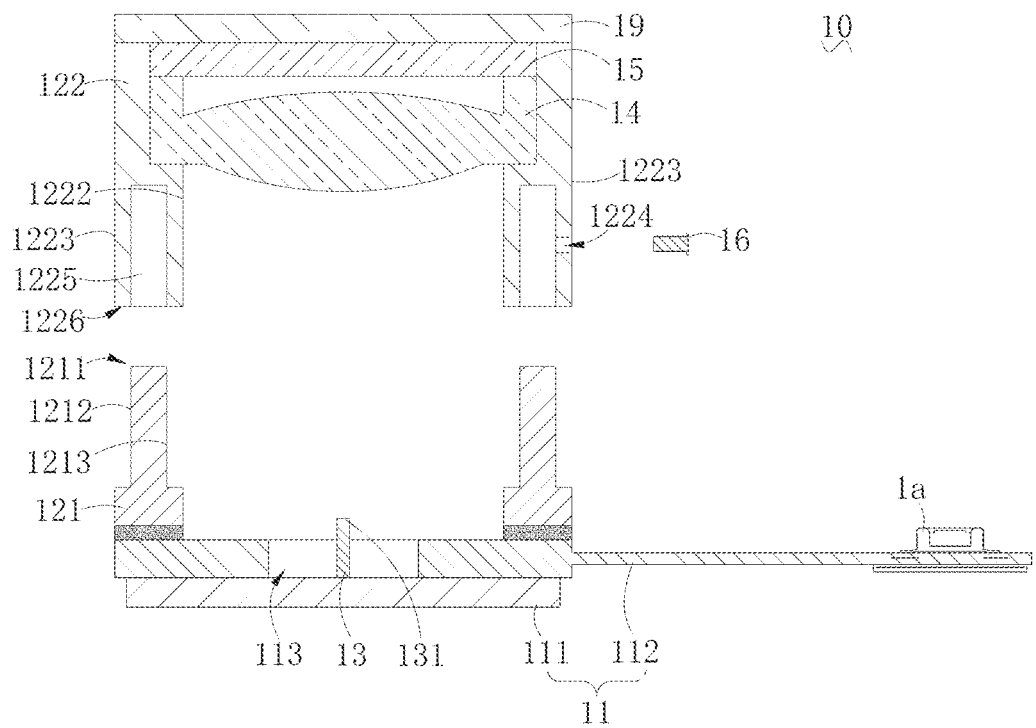

For example, as illustrated in FIG. 7, in some embodiments, the annular thread groove 1225 is defined in the bottom face 1226 of the support 122, the thread is formed on the side wall (1212, 1213) of the top end 1221 of the base 121, and the support 122 and the base 121 are movably connected through screw engagement of the thread and the thread groove 1225. The side walls (1212, 1213) of the base 121 are screwed into the thread groove by rotating the support 122, and when the support 122 is rotated, it is enabled to move relative to the base 121 in the axial direction of the lens barrel assembly 12. Specifically, the thread may be the internal thread formed on the outer side wall 1212 of the base 121, while the external thread may be formed on the wall of the thread groove 1225 adjacent to the outer side wall 1223 of the support 122, and the internal thread is screwed with the external thread. Or, the thread may be the external thread formed on the inner side wall 1213 of the base 121, while the inner thread may be formed on the wall of the thread groove 1225 adjacent to the inner side wall 1222 of the support 122, and the external thread is screwed with the internal thread. The thread may also include both the external thread and the internal thread formed on the side walls (1212, 1213) of the base 121 in this embodiment, and the thread groove 1225 may be fitted with the external thread and the internal thread on the side walls (1212, 1213) of the base 121 simultaneously. It can be understood that the above locking hole 1214 can be defined in the outer side wall 1223 of the support 122, and the blocking member 16 can pass through the locking hole 1214 and abut against the support 122, which are not described herein.

FIGS. 8 to 16 illustrate other embodiments of the present application, which are different from the embodiment shown in FIG. 3 to FIG. 7 in the following aspects.

The first component is the collimation support 40 and the second component is the diffraction support 50. That is, the lens barrel assembly 12 includes the collimation support 40 and the diffraction support 50, and the collimation support 40 and the diffraction support 50 are separate structures independent of each other. In the present embodiment, the collimation element 14 is supported by the collimation support 40 and the diffraction element 15 is supported by the diffraction support 50.

Figure 8:
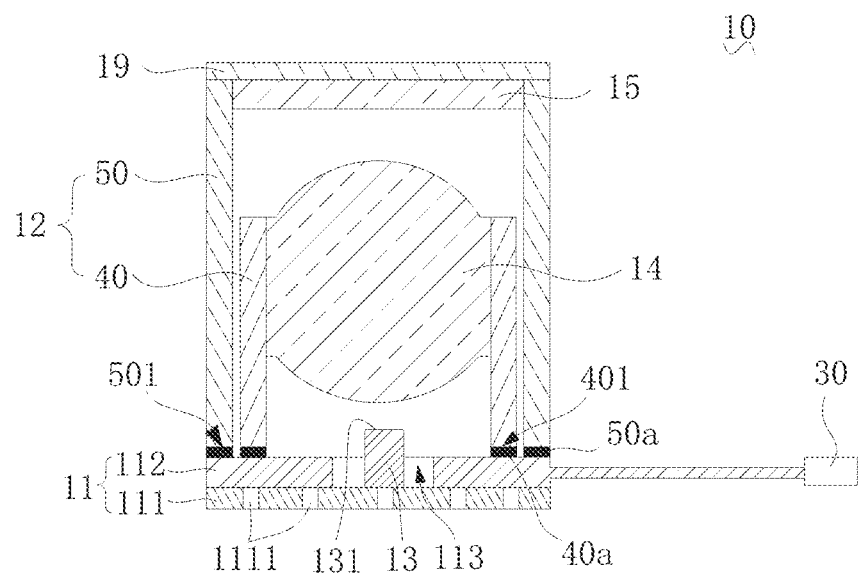
FIGS. 8-13 are schematic views illustrating a laser projector according to another embodiment of the present disclosure.

Specifically, as illustrated in FIG. 8, the collimation support 40 is supported on the substrate assembly 11, and the diffraction support 50 is also supported on the substrate assembly 11. A bottom face 401 of the collimation support 40 is bonded to the substrate assembly 11 by adhesive 40*a*, and a bottom face 501 of the diffraction support 50 is also bonded to the substrate assembly 11 by adhesive 50*a*. The collimation support 40 is received in the diffraction support 50.

The protective cover 19 is supported on the diffraction support 50, and can be bonded to the diffraction support 50 by the adhesive to securely connect the protective cover 19 and the diffraction support 50. The protective cover 19 can prevent the diffraction element 15 from being exposed to the outside of the lens barrel while preventing the diffraction element 15 from falling off, thereby making the diffraction element 15 waterproof and dustproof. Certainly, in other embodiments, the protective cover 19 may be provided with a light-transparent hole, and the light-transparent hole faces an optical active area of the diffraction element 15 with the largest area to avoid obscuring the optical path of the diffraction element 15.

In the laser projector 10 of the present embodiment, the collimation element 14 is supported by the collimation support 40, and the diffraction element 15 is supported by the diffraction support 50, and the collimation support 40 and the diffraction support 50 are separate structures independent of each other, rather than being integrally formed. Thus, the collimation element 14 and the diffraction element 15 can be mounted separately and then assembled without being limited by space. The relative positions of the light source 13, the collimation element 14 and the diffraction element 15 are easy to adjust, the mounting accuracy is easy to control, and the mounting efficiency is high.

In some embodiments, when the collimation support 40 is supported on the substrate assembly 11, an annular receiving hole may be defined at the position of the circuit board 112 where the collimation support 40 is supported. In this way, the collimation support 40 can be partially accommodated in the receiving hole, the bottom face 401 of the collimation support 40 is coated with the adhesive 40*a*, and the collimation support 40 is fixedly connected with a substrate 62 through the adhesive 40*a*, so that the height of the laser projector 10 can be reduced. Similarly, when the diffraction support 50 is supported on the substrate assembly 11, the annular receiving hole may be defined at the position of the circuit board 112 where the diffraction support 50 is supported. In this way, the diffraction support 50 can be partially accommodated in the receiving hole, and the bottom face 501 of the diffraction support 50 is coated with the adhesive 50*a*. The diffraction support 50 is fixedly connected to the substrate 62 through the adhesive 50*a*, so that the height of the laser projector 10 can be reduced.

Figure 9:
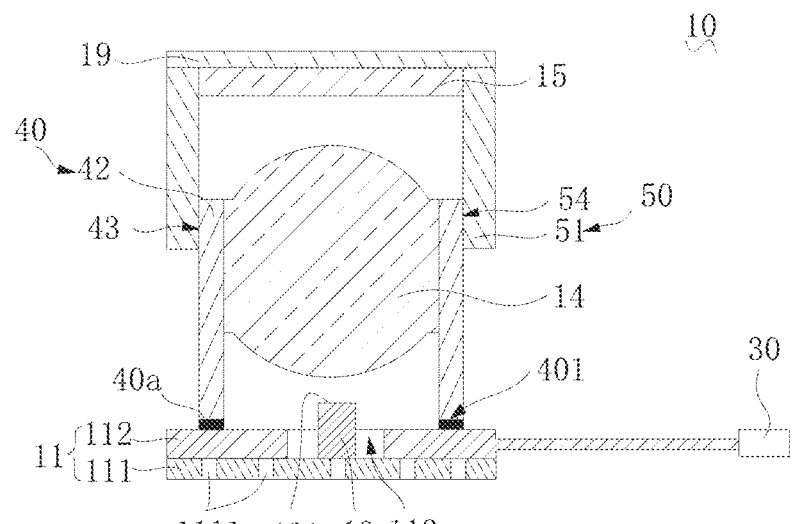

As illustrated in FIG. 9, in some embodiments, the collimation support 40 is supported on the substrate assembly 11. Specifically, the bottom face 401 of the collimation support 40 is coated with the adhesive 40*a*, and the collimation support 40 is fixedly connected to the circuit board 112 through the adhesive 40*a*. The internal thread is formed on the inner side wall 54 of the bottom end 51 of the diffraction support 50, the external thread is formed on the outer side wall 43 of the top end 42 of the collimation support 40, and the internal thread of the diffraction support 50 is in screw engagement with the external thread of the collimation support 40. Thus, the diffraction support 50 and the collimation support 40 are connected by screwing, which has high stability and is convenient to install. Further, the collimation support 40 is partially received in the diffraction support 50, and all of the laser emitted from the collimation element 14 can be incident on the diffraction element 15, so the utilization efficiency of the laser is higher.

Figure 10:
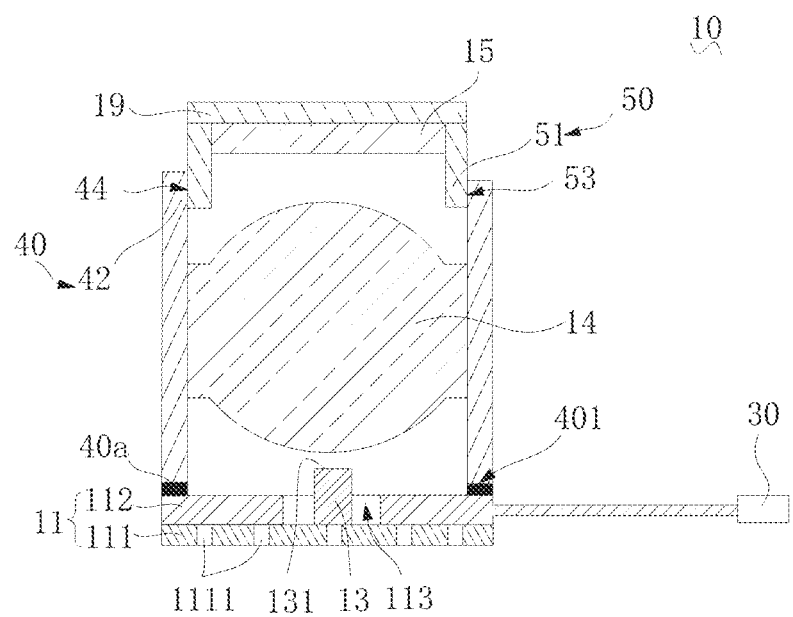

As illustrated in FIG. 10, in some embodiments, the collimation support 40 is supported on the substrate assembly 11. Specifically, the bottom face 401 of the collimation support 40 is coated with the adhesive 40*a*, and the collimation support 40 is fixedly connected to the circuit board 112 through the adhesive 40*a*. The external thread is formed on the outer side wall 53 of the bottom end 51 of the diffraction support 50, the internal thread is formed on the inner side wall 44 of the top end 42 of the collimation support 40, and the external thread of the diffraction support 50 is in screw engagement with the internal thread of the collimation support 40. Thus, the diffraction support 50 and the collimation support 40 are connected by screwing, which has high stability and is convenient to install.

Figure 11:
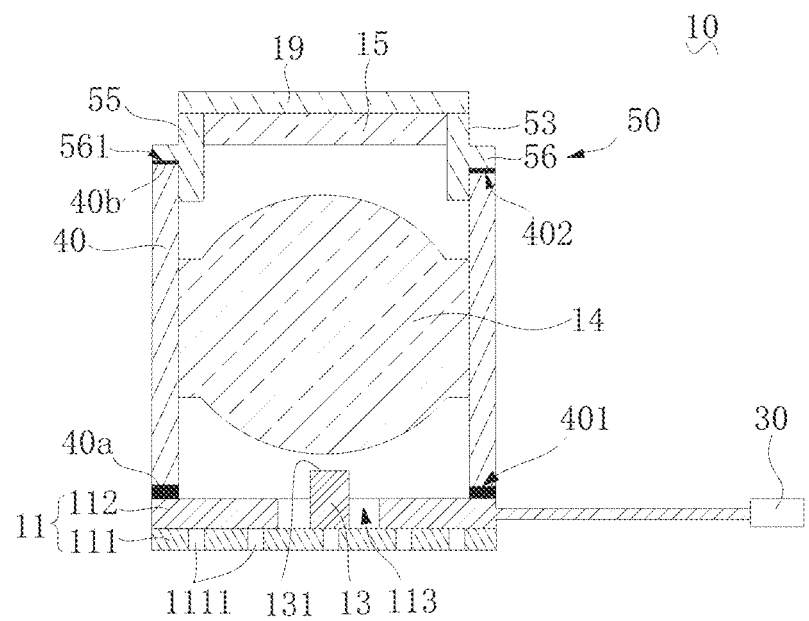

As illustrated in FIG. 11, in some embodiments, the collimation support 40 is supported on the substrate assembly 11. Specifically, the bottom face 401 of the collimation support 40 is coated with the adhesive 40*a*, and the collimation support 40 is fixedly connected to the circuit board 112 through the adhesive 40*a*. The diffraction support 50 includes the support body 55 and the annular boss 56 extending out from the outer side wall 53 of the support body 55. The support body 55 is partially accommodated in the collimation support 40, and the annular boss 56 is fixed on the top of the collimation support 40. Specifically, a bottom face 561 of the annular boss 56 is coated with the adhesive 40*b*, and the annular boss 56 is fixedly bonded to the top face 402 of the collimation support 40 through the adhesive 40*b*. Thus, the collimation support 40 and the diffraction support 50 are bonded through the adhesive 40*b*, which is convenient to install. The annular boss 56 can prevent the diffraction support 50 from falling off in the direction of the collimating element 30. The lens barrel assembly 12 has higher stability.

Figure 12:
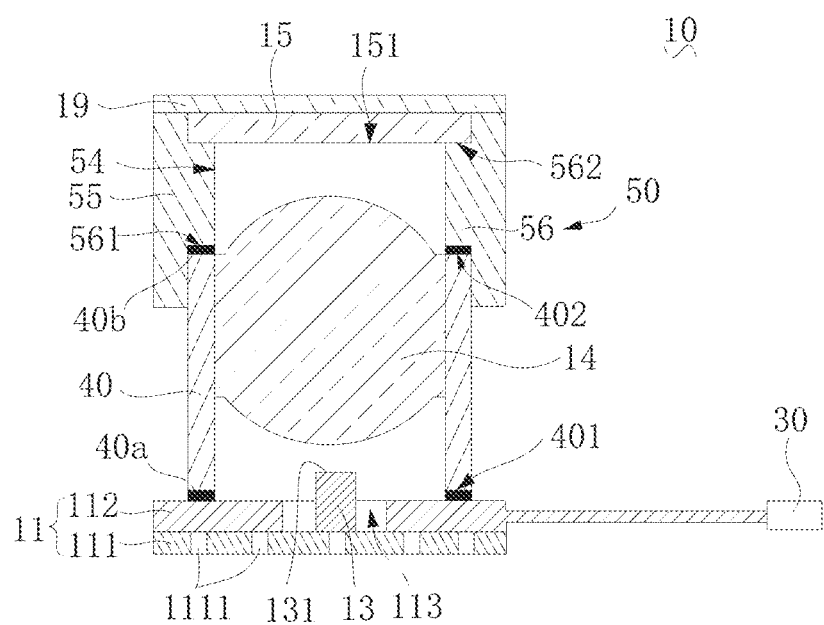

As illustrated in FIG. 12, in some embodiments, the collimation support 40 is supported on the substrate assembly 11. Specifically, the bottom face 401 of the collimation support 40 is coated with the adhesive 40*a*, and the collimation support 40 is fixedly connected to the circuit board 112 through the adhesive 40*a*. The diffraction support 50 includes the support body 55 and the annular boss 56 extending out from the inner side wall 54 of the support body 55. The collimation support 40 is partially accommodated in the support body 55, and the annular boss 56 is fixed on the top of the collimation support 40. Specifically, the bottom face 561 of the annular boss 56 is coated with the adhesive 40*b*, and the annular boss 56 is fixedly bonded to the top face 402 of the collimation support 40 through the adhesive 40*b*. Thus, the collimation support 40 and the diffraction support 50 are bonded through the adhesive 40*b*, which is convenient to install. The annular boss 56 can prevent the diffraction support 50 from falling off in the direction of the collimating element 30. The lens barrel assembly 12 has higher stability. Further, the collimation support 40 is partially accommodated in the diffraction support 50, and all of the laser emitted from the collimation support 14 can be incident on the diffraction element 15, so the utilization efficiency of the laser is higher.

Further, in some embodiments, the annular boss 56 can also be configured to support the diffraction element 15. In this case, the bottom face 561 of the annular boss 56 is bonded to the top face 402 of the collimation support 40 through the adhesive 40b, and the top face 562 of the annular boss 56 is abutted against the incident face 151 of the diffraction element 15. In this way, the detachment of the diffraction element 15 can be avoided, and the diffraction element 15 can be more stably disposed to the diffraction support 50.

Figure 13:
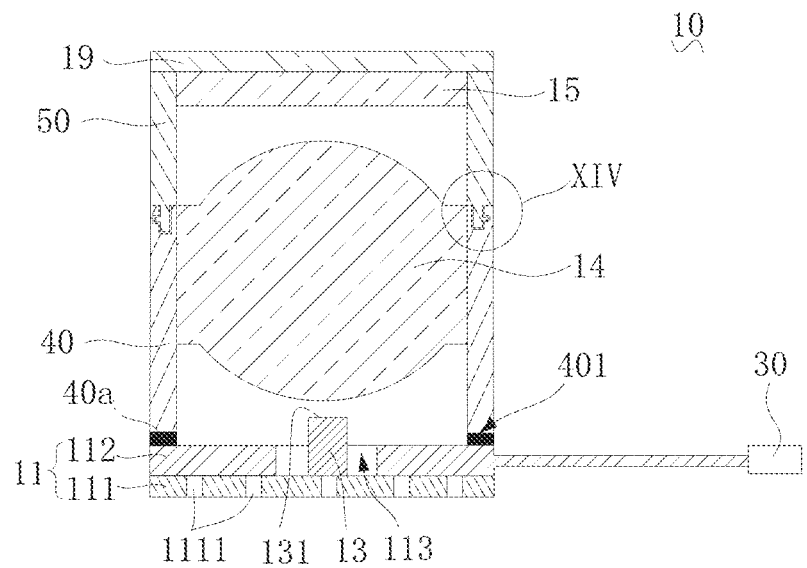
Figure 14:
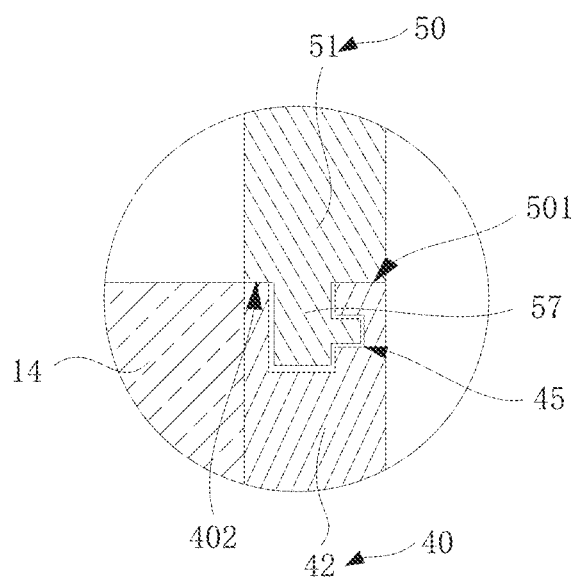
FIG. 14 is an enlarged schematic view illustrating a portion XIV of the laser projector shown in FIG. 13.

As illustrated in FIGS. 13 and 14, in some embodiments, the collimation support 40 is supported on the substrate assembly 11. Specifically, the bottom face 401 of the collimation support 40 is coated with the adhesive 40a, and the collimation support 40 is fixedly connected to the circuit board 112 through the adhesive 40a. The bottom end 51 of the diffraction support 50 is fixed to the top end 42 of the collimation support 40 in the snap-fitted manner. The top face 402 of the collimation support 40 is provided with the snapping groove 45, and the bottom face 501 of the diffraction support 50 is provided with the elastic snapping hook 57. A plurality of the snapping grooves 45 (two or greater than two) and a plurality of the elastic snapping hooks 57 (two or greater than two) are provided, and the positions of the plurality of snapping grooves 45 are in one-to-one correspondence with the positions of the plurality of elastic snapping hooks 57. Thus, the elastic snapping hook 57 of the diffraction support 50 is connected with the snapping groove 45 of the collimation support 40 in the snap-fitted manner. In this way, the diffraction support 50 and the collimation support 40 are connected by the snap-fitted manner, which has high stability and is convenient to install.

Certainly, in some embodiments, the elastic snapping hook 57 can be disposed to the top face 402 of the collimation support 40, and the snapping groove 45 can be disposed to the bottom face 501 of the diffraction support 50. A plurality of the snapping grooves 45 and a plurality of the elastic snapping hooks 57 are provided, and the positions of the plurality of snapping grooves 45 are in one-to-one correspondence with the positions of the plurality of elastic snapping hooks 57. The elastic snapping hook 57 of the collimation support 40 is connected with the snapping groove 45 of the diffraction support 50 in the snap-fitted manner. One snapping groove 45 and one elastic snapping hook 57 may also be provided. In this case, the snapping groove 45 and the snapping hook 57 are both complete annular structures.

Figure 15:
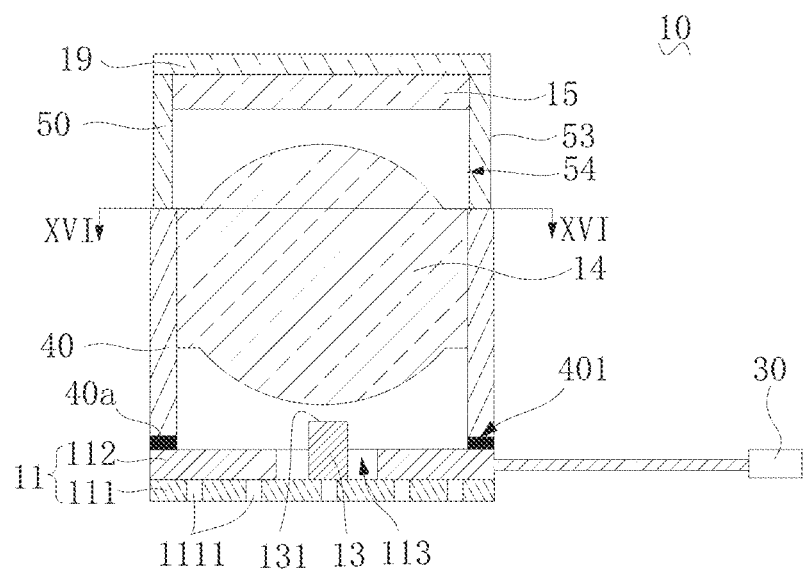
FIG. 15 is a schematic view illustrating a laser projector according to another embodiment of the present disclosure.
Figure 16:
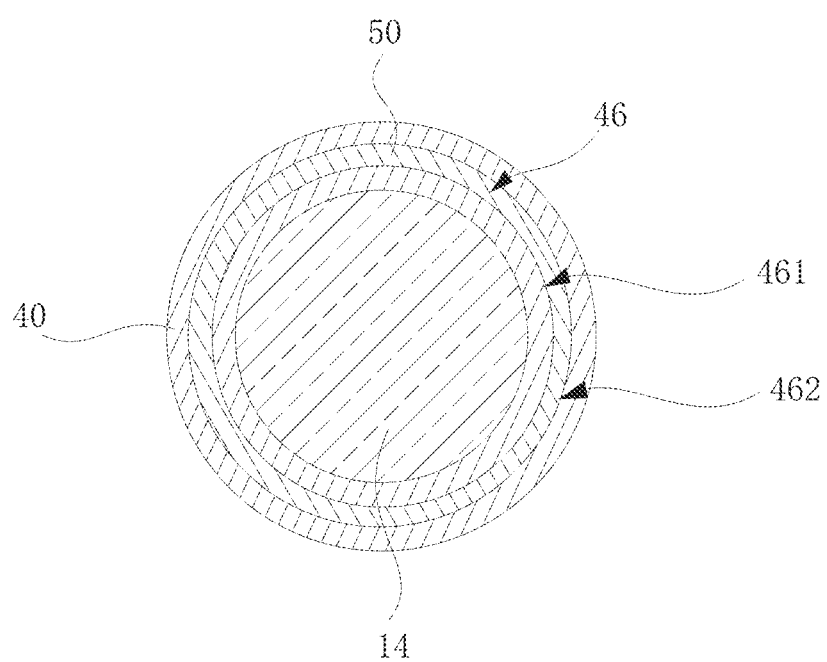
FIG. 16 is a sectional view of the laser projector taken along line XVI-XVI in FIG. 15.

As illustrated in FIGS. 15 and 16, in some embodiments, the collimation support 40 is supported on the substrate assembly 11. Specifically, the bottom face 401 of the collimation support 40 is coated with the adhesive 40a, and the collimation support 40 is fixedly connected to the circuit board 112 through the adhesive 40a. The annular thread groove 46 is defined in the top face 402 of the collimation support 40, and the thread is formed on the side wall of the bottom end 51 of the diffraction support 50. Specifically, the external thread is formed on a first inner wall 461 of the thread groove 46, and the internal thread is formed on the inner side wall 54 of the bottom end 51 of the diffraction support 50, and the internal thread on the inner side wall 54 is in screw engagement with the external thread on the thread groove 46 so as to fixedly connect the diffraction support 50 and the collimation support 40. Or, the internal thread is formed on a second inner wall 462 of the thread groove 46, and the external thread is formed on the outer side wall 53 of the bottom end 51 of the diffraction support 50, and the external thread on the outer side wall 53 is in screw engagement with the internal thread on the thread groove 46 so as to fixedly connect the diffraction support 50 and the collimation support 40. Thus, the diffraction support 50 and the collimation support 40 are connected by screwing, which has high stability and is convenient to install.

Figure 17:
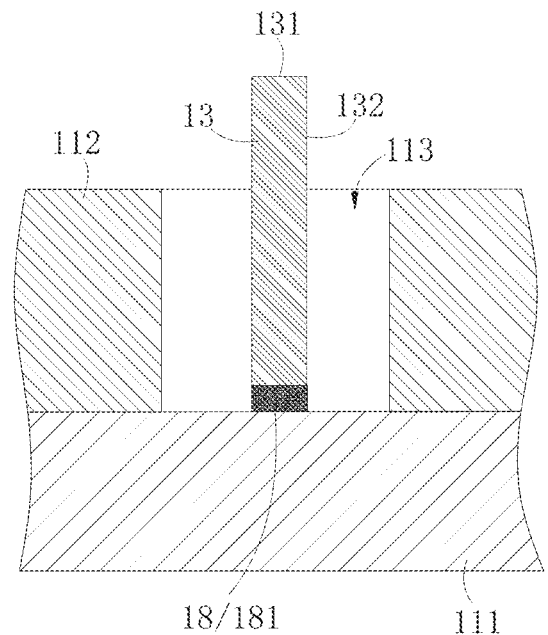
FIGS. 17-19 are partial schematic views illustrating a laser projector according to an embodiment of the present disclosure.
Figure 18:
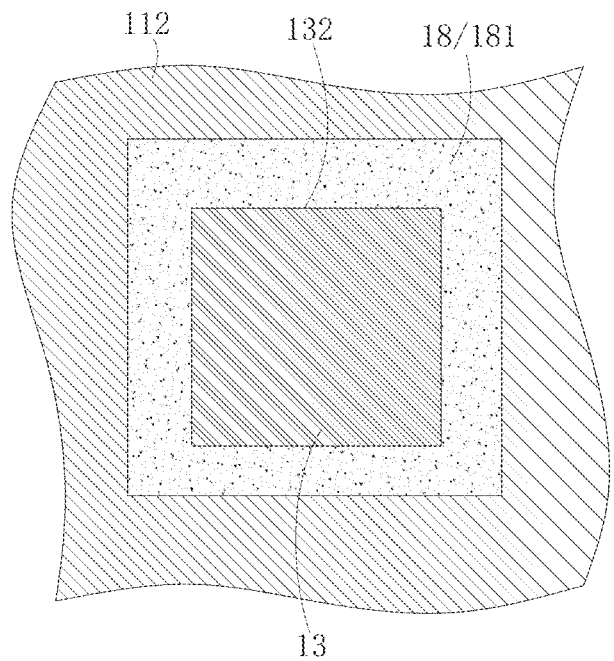

As illustrated in FIGS. 3 and 17, in some embodiments, the laser projector further includes a fixing member 18. Specifically, the light source 13 has a columnar shape, and an end face of the light source 13 away from the substrate 112 forms a light emitting face 131. The laser is emitted from the light emitting face 131, and the light emitting face 131 faces the collimating element 14. The light source 13 is fixed on the substrate 112. The fixing member may be the sealant 181. The light source 13 may be adhered to the substrate 112 by the sealant 181. For example, a face of the light source 13 opposite to the light emitting face 131 is adhered to the substrate 112. As illustrated in FIG. 18, a side face 132 of the light source 13 may also be adhered to the substrate 112. The sealant 181 wraps the surrounding side faces. Alternatively, the sealant 181 may adhere only one side face 132 to the substrate 112, or adhere several side faces to the substrate 112. In this case, the sealant 181 may be the thermal conductive glue to conduct heat generated by the operation of the light source 13 to the substrate 112. Since the edge-emitting laser usually has a slender shape, when the light emitting face 131 of the edge-emitting laser faces the collimation element 14, the edge-emitting laser is arranged vertically. In this case, the edge-emitting laser tends to encounter accidents such as dropping, shifting or shaking, the sealant 181 can be provided to fix the edge-emitting laser so as to prevent the edge-emitting laser from encountering accidents such as dropping, shifting or shaking.

Figure 19:
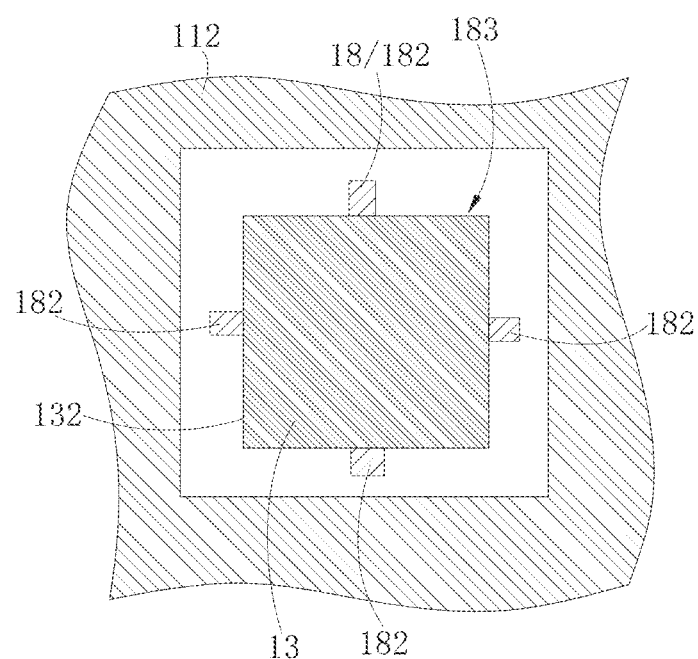

As illustrated in FIG. 19, in some embodiments, the fixing member 18 may also be an elastic support frame 182. Two or more support frames 182 may be provided. The plurality of support frames 182 defines the accommodating space together. The accommodating space is used for receiving the light source 13 therein, and the plurality of support frames 182 supports the light source 13. In this way, it is possible to prevent the light source 13 from shaking.

Further, as illustrated in FIG. 15, a heat dissipation hole 1111 is defined in the substrate 111. The heat dissipation hole 1111 may be filled with the thermal conductive glue to dissipate heat from the light source 13.

Reference throughout this specification to "some embodiments", "an embodiment", "some embodiments", "illustrative embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from the scope of the present disclosure.

What is claimed is:

1. A laser projector, comprising:
   a substrate assembly;
   a lens barrel assembly comprising a first component and a second component movably connected to each other, the first component being disposed to the substrate assembly;
   an edge-emitting laser disposed to the substrate assembly;
   a collimation element mounted to one of the first component and the second component and configured to collimate a laser emitted by the edge-emitting laser, the edge-emitting laser comprising a light emitting face, and the light emitting face facing the collimation element;
   a diffraction element disposed to the second component and configured to diffract the laser collimated by the collimation element to form a laser pattern;
   wherein the laser projector further comprises a fixing member configured to fix the edge-emitting laser to the substrate assembly; and
   wherein the fixing member comprises at least two elastic support frames arranged on the substrate assembly, the at least two support frames define an accommodating space together, the accommodating space is configured to receive the edge-emitting laser, and the at least two support frames are configured to support the edge-emitting laser.

2. The laser projector according to claim 1, wherein the first component is a base and the second component is a support, the support is movable along an axial direction of the lens barrel assembly relative to the base, and the collimation element is disposed to the support.

3. The laser projector according to claim 2, wherein an external thread is formed on an outer side wall of a top end of the base, and an internal thread is formed on an inner side wall of a bottom end of the support, and the support and the base are movably connected through screw engagement of the internal thread and the external thread.

4. The laser projector according to claim 2, wherein the laser projector further comprises a blocking member, a blocking hole is defined in an outer side wall of the support, and the blocking member passes through the blocking hole and can be abutted against the base.

5. The laser projector according to claim 2, wherein an internal thread is formed on an inner side wall of a top end of the base, and an external thread is formed on an outer side wall of a bottom end of the support, and the support and the base are movably connected through screw engagement of the external thread and the internal thread.

6. The laser projector according to claim 2, wherein the laser projector further comprises a locking member, a locking hole is defined in an outer side wall of the base, and the locking member passes through the locking hole and can be abutted against the support.

7. The laser projector according to claim 2, wherein an annular thread groove is defined in a top face of the base, a thread is formed on a side wall of a bottom end of the support, and the support and the base are movably connected through screw engagement of the thread and the thread groove; or
   the annular thread groove is defined in a bottom face of the support, the thread is formed on a side wall of a top end of the base, and the support and the base are movably connected through screw engagement of the thread groove and the thread.

8. The laser projector according to claim 1, wherein the first component is a collimation support, the second component is a diffraction support, the collimation support and the diffraction support are separated structures; the collimation element is supported by the collimation support; and the diffraction element is supported by the diffraction support.

9. The laser projector according to claim 8, wherein the collimation support and the diffraction support are both supported on the substrate assembly, and the collimation support is accommodated in the diffraction support.

10. The laser projector according to claim 8, wherein the collimation support is supported on the substrate assembly, an internal thread is formed on an inner side wall of a bottom end of the diffraction support, an external thread is formed on an outer side wall of a top end of the collimation support, and the diffraction support and the collimation support are connected through screw engagement of the internal thread and the external thread; or
   the collimation support is supported on the substrate assembly, the external thread is formed on an outer side wall of the bottom end of the diffraction support, the internal thread is formed on an inner side wall of the top end of the collimation support, and the diffraction support and the collimation support are connected through screw engagement of the internal thread and the external thread.

11. The laser projector according to claim 8, wherein the collimation support is supported on the substrate assembly, the diffraction support comprises a support body and an annular boss extending out from an outer side wall of the support body, the support body is partially accommodated in the collimation support, and the annular boss is fixed to a top of the collimation support; or
   the collimation support is supported on the substrate assembly, the diffraction support comprises the support body and the annular boss extending out from an inner side wall of the support body, the collimation support is partially accommodated in the support body, and the annular boss is fixed to the top of the collimation support.

12. The laser projector according to claim 8, wherein the collimation support is supported on the substrate assembly, a bottom end of the diffraction support is fixed to a top end of the collimation support in a snap-fitted manner.

13. The laser projector according to claim 12, wherein a top face of the collimation support is provided with a snapping groove, a bottom face of the diffraction support is provided with an elastic snapping hook, and the elastic snapping hook is connected with the snapping groove in the snap-fitted manner.

14. The laser projector according to claim 13, wherein the snapping groove and the elastic snapping hook are both annular.

15. The laser projector according to claim 8, wherein the collimation support is supported on the substrate assembly, an annular thread groove is defined in a top face of the collimation support, and a thread is formed on a side wall of a bottom end of the diffraction support, and the thread is screwed into the thread groove to fix the bottom end of the diffraction support to the top face of the collimation support; or
   the collimation support is supported on the substrate assembly, the annular thread groove is defined in a bottom face of the diffraction support, and the thread is formed on a side wall of a top end of the collimation support, and the thread is screwed into the thread groove to fix the top end of the collimation support to the bottom face of the diffraction support.

16. The laser projector according to claim 1, wherein the substrate assembly comprises a substrate and a circuit board, the circuit board is disposed to the substrate and electrically connected to the edge-emitting laser, the fixing member comprises a sealant disposed between the edge-emitting laser and the substrate.

17. A camera unit, comprising:
a laser projector, comprising:
   a substrate assembly;
   a lens barrel assembly comprising a first component and a second component movably connected to each other, the first component being disposed to the substrate assembly;
   an edge-emitting laser disposed to the substrate assembly;
   a collimation element mounted to one of the first component and the second component and configured to collimate a laser emitted by the edge-emitting laser towards the collimation element; and
   a diffraction element disposed to the second component and configured to diffract the laser collimated by the collimation element to form a laser pattern;
an image acquirer configured to acquire the laser pattern projected by the laser projector into a target space; and
a processor configured to process the laser pattern to obtain a depth image,
wherein the laser projector further comprises a fixing member configured to fix the edge-emitting laser to the substrate assembly; and
wherein the fixing member comprises at least two elastic support frames arranged on the substrate assembly, the at least two support frames define an accommodating space together, the accommodating space is configured to receive the edge-emitting laser, and the at least two support frames are configured to support the edge-emitting laser.

18. An electronic device, comprising:
a housing; and
a camera unit, comprising:
   a laser projector, comprising
      a substrate assembly;
      a lens barrel assembly comprising a first component and a second component disposed movably with respect to each other, the first component being connected to the substrate assembly;
      an edge-emitting laser disposed inside the lens barrel assembly;
      a collimation element mounted to one of the first component and the second component and configured to collimate a laser emitted by the edge-emitting laser, the edge-emitting laser comprising a light emitting face, and the light emitting face facing the collimation element; and
      a diffraction element disposed to the second component and configured to diffract the laser collimated by the collimation element;
   an image acquirer configured to acquire the laser pattern projected by the laser projector into a target space; and
   a processor configured to process the laser pattern to obtain a depth image;
the camera unit being arranged in the housing and exposed out of the housing to acquire the depth image,
wherein the laser projector further comprises a fixing member configured to fix the edge-emitting laser to the substrate assembly; and
wherein the fixing member comprises at least two elastic support frames arranged on the substrate assembly, the at least two support frames define an accommodating space together, the accommodating space is configured to receive the edge-emitting laser, and the at least two support frames are configured to support the edge-emitting laser.

* * * * *